US012248282B2

(12) United States Patent
Kang et al.

(10) Patent No.: US 12,248,282 B2
(45) **Date of Patent: *Mar. 11, 2025**

(54) DISPLAY DEVICE AND ELECTRONIC WATCH INCLUDING THE SAME

(71) Applicant: SAMSUNG DISPLAY CO., LTD., Yongin-si (KR)

(72) Inventors: Ki Nyeng Kang, Seoul (KR); Keum Nam Kim, Seoul (KR); Jong Hyun Choi, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,966

(22) Filed: Aug. 17, 2023

(65) Prior Publication Data

US 2023/0393534 A1 Dec. 7, 2023

Related U.S. Application Data

(63) Continuation of application No. 17/838,395, filed on Jun. 13, 2022, now Pat. No. 11,762,341, which is a (Continued)

(30) Foreign Application Priority Data

Jun. 11, 2015 (KR) ........................ 10-2015-0082715

(51) Int. Cl.

| | |
|---|---|
| ***G04G 9/04*** | (2006.01) |
| ***G04B 47/04*** | (2006.01) |
| ***G04C 17/00*** | (2006.01) |
| ***G04G 9/00*** | (2006.01) |
| ***G04G 17/04*** | (2006.01) |

(52) U.S. Cl.

CPC ............... *G04G 9/04* (2013.01); *G04B 47/04* (2013.01); *G04C 17/0091* (2013.01); *G04G 9/0082* (2013.01); *G04G 17/045* (2013.01)

(58) Field of Classification Search

CPC ...... G04G 9/04; G04G 9/0082; G04G 17/045; G04B 19/04; G04B 47/04; G04C 17/0091; G04R 20/00; G04R 20/02; G04R 20/04; G04R 20/06; H01L 51/0097; H01L 51/5253; H01L 51/5246; H01L 51/5237; H01L 27/3267; H01L 51/5293; H01L 27/3276

See application file for complete search history.

(56) References Cited

U.S. PATENT DOCUMENTS

| | | |
|---|---|---|
| 4,814,757 A | 3/1989 | Patterson et al. |
| 5,239,522 A | 8/1993 | Corlet |

(Continued)

FOREIGN PATENT DOCUMENTS

| | | |
|---|---|---|
| CN | 1199191 | 11/1998 |
| CN | 1246932 A | 3/2000 |

(Continued)

*Primary Examiner* — Edwin A. Leon

(74) *Attorney, Agent, or Firm* — F. CHAU & ASSOCIATES, LLC

(57) ABSTRACT

A display device includes a substrate having a through-hole. The display device also includes a display unit formed on the substrate and surrounding the through-hole, and the display unit is configured to display an image and includes pixels.

30 Claims, 8 Drawing Sheets

Related U.S. Application Data continuation of application No. 17/112,210, filed on Dec. 4, 2020, now Pat. No. 11,360,438, which is a continuation of application No. 16/532,710, filed on Aug. 6, 2019, now Pat. No. 10,877,440, which is a continuation of application No. 16/166,888, filed on Oct. 22, 2018, now Pat. No. 10,372,085, which is a continuation of application No. 14/997,906, filed on Jan. 18, 2016, now Pat. No. 10,108,149.

(56) References Cited

U.S. PATENT DOCUMENTS

| | | | |
|---|---|---|---|
| 5,270,693 | A | 12/1993 | Wyler et al. |
| 5,883,861 | A | 3/1999 | Moser et al. |
| 6,275,450 | B1 | 8/2001 | Makiba |
| 6,580,479 | B1 | 6/2003 | Sekiguchi et al. |
| 6,646,697 | B1 | 11/2003 | Sekiguchi et al. |
| 6,937,301 | B2 | 8/2005 | Sekiguchi et al. |
| 7,271,859 | B2 | 9/2007 | Lee |
| 8,194,222 | B2 | 6/2012 | Seki et al. |
| 8,873,015 | B2 | 10/2014 | Seki et al. |
| 8,934,321 | B2 | 1/2015 | Fung |
| 9,335,743 | B2 | 5/2016 | Akiyama |
| 9,530,831 | B2 | 12/2016 | Lee et al. |
| 9,658,604 | B2 | 5/2017 | Nagahama |
| 10,026,799 | B2 | 7/2018 | Jeong |
| 10,108,149 | B2 | 10/2018 | Kang et al. |
| 10,372,085 | B2 | 8/2019 | Kang et al. |
| 10,431,778 | B2 | 10/2019 | Gwon et al. |
| 10,877,440 | B2 | 12/2020 | Kang et al. |
| 11,101,340 | B2 | 8/2021 | Sung et al. |
| 11,360,438 | B2 | 6/2022 | Kang et al. |
| 2003/0165086 | A1 | 9/2003 | Brewer et al. |
| 2007/0070274 | A1 | 3/2007 | Yu et al. |
| 2007/0242569 | A1 | 10/2007 | Inoue et al. |
| 2008/0055831 | A1 | 3/2008 | Satoh |
| 2008/0123473 | A1 | 5/2008 | Ozawa et al. |
| 2008/0225216 | A1 | 9/2008 | Shimodaira |
| 2009/0051636 | A1 | 2/2009 | Natori |
| 2010/0061195 | A1 | 3/2010 | Kanbayashi |
| 2010/0085343 | A1 | 4/2010 | Yamada |
| 2010/0207852 | A1 | 8/2010 | Cok |
| 2011/0050657 | A1 | 3/2011 | Yamada |
| 2013/0002133 | A1 | 1/2013 | Jin et al. |
| 2013/0076268 | A1 | 3/2013 | Choi et al. |
| 2014/0042406 | A1 | 2/2014 | Degner et al. |
| 2015/0014650 | A1 | 1/2015 | Lim et al. |
| 2015/0071040 | A1 | 3/2015 | Akiyama |
| 2016/0363909 | A1 | 12/2016 | Kang et al. |
| 2017/0162637 | A1* | 6/2017 | Choi .................... G09G 3/3225 |
| 2018/0129106 | A1* | 5/2018 | Gao .................... G02F 1/13781 |
| 2019/0245020 | A1 | 1/2019 | D'Souza et al. |
| 2019/0056699 | A1 | 2/2019 | Kang et al. |
| 2019/0096291 | A1 | 10/2019 | Wei et al. |
| 2019/0361405 | A1 | 11/2019 | Kang et al. |
| 2021/0088978 | A1 | 3/2021 | Kang et al. |
| 2022/0317631 | A1 | 10/2022 | Kang et al. |
| 2022/0350190 | A1 | 11/2022 | Schindler et al. |

FOREIGN PATENT DOCUMENTS

| | | | |
|---|---|---|---|
| CN | 101430473 | A | 5/2009 |
| CN | 103676638 | | 3/2014 |
| CN | 103718117 | A | 4/2014 |
| CN | 104332132 | | 2/2015 |
| CN | 104698805 | A | 6/2015 |
| EP | 0927917 | | 7/1999 |
| JP | 1993-060881 | | 3/1993 |
| JP | 2001-075112 | | 3/2001 |
| JP | 3227853 | | 9/2001 |
| JP | 2003-167271 | | 6/2003 |
| JP | 2007-232882 | | 9/2007 |
| JP | 2009-047902 | | 3/2009 |
| JP | 2009-115686 | | 5/2009 |
| JP | 2010-014475 | | 1/2010 |
| KR | 10-2005-0001569 | | 1/2005 |
| KR | 10-2008-0044047 | | 5/2008 |
| KR | 10-2008-0113823 | | 12/2008 |
| KR | 10-2014-0086708 | | 7/2014 |
| KR | 10-2017-0030719 | | 3/2017 |
| KR | 10-2018-0129097 | | 12/2018 |
| KR | 10-2019-0010058 | | 1/2019 |
| WO | 2015-029704 | | 3/2006 |

* cited by examiner

1000

DISPLAY DEVICE AND ELECTRONIC WATCH INCLUDING THE SAME

INCORPORATION BY REFERENCE TO ANY PRIORITY APPLICATIONS

This application is a continuation of U.S. patent application Ser. No. 17/838,395 filed on Jun. 13, 2022, which is a continuation of U.S. patent application Ser. No. 17/112,210 filed on Dec. 4, 2020, now U.S. Pat. No. 11,360,438 issued on Jun. 14, 2022, which is a continuation of U.S. patent application Ser. No. 16/532,710 filed on Aug. 6, 2019, now U.S. Pat. No. 10,877,440 issued on Dec. 29, 2020, which is a continuation of U.S. patent application Ser. No. 16/166,888 filed Oct. 22, 2018, now U.S. Pat. No. 10,372,085 issued on Aug. 6, 2019, which is a continuation of U.S. patent application Ser. No. 14/997,906, now U.S. Pat. No. 10,108,149 issued on Oct. 23, 2018, which claims priority to and the benefit of Korean Patent Application No. 10-2015-0082715 filed in the Korean Intellectual Property Office on Jun. 11, 2015, the entire contents of which are incorporated herein by reference.

BACKGROUND

Field

The described technology generally relates to a display device and an electronic watch including the same.

Description of the Related Technology

In general, examples of display device technologies include organic light-emitting diode (OLED) displays, liquid crystal displays (LCDs), plasma display panel (PDPs), and the like.

Recently, electronic watches including a display device that displays a clock face and clock hands, such as an hour hand, a minute hand, and the like, are being developed and marketed.

SUMMARY OF CERTAIN INVENTIVE ASPECTS

One inventive aspect relates to a display device that include mechanical watch needles, and a watch including the same.

Another aspect is a display device including: a substrate comprising a through-hole; and a display unit provided on the substrate and surrounding the through-hole, and displaying an image.

The substrate can further include: a display area neighboring the through-hole where at least a part of the display portion is formed; and a non-display area neighboring the display area.

The non-display area surrounds the display area.

The non-display area can include: a first sub non-display area surrounding an outer edge of the display area; and a second sub non-display area surrounding an outer edge of the through-hole between the through-hole and the display area.

The display unit can include: a plurality of wires and a plurality of pixels connected to the plurality of wires, and a wire neighboring the through-hole among the plurality of wires is curved and extends along the edge of the through-hole.

The plurality of wires can include: a first line extended in a first direction on the substrate; and a second line extended in a second direction that crosses the first direction on the substrate and crosses the first line, and one or more of the first and second lines neighboring the through-hole is curved and extends along the edge of the through-hole.

The pixel can include an organic light emitting diode.

The display portion can further include a first driving circuit provided corresponding to the non-display area and connected to the plurality of wires.

The display portion can further include a second driving circuit provided corresponding to the display area and connected to the plurality of wires.

One or more of the substrate and the display portion can have a ring shape.

The through-hole can be provided in a plurality, and the plurality of through-holes can be separated from each other and surrounded by the display portion.

Another aspect is a display device including a substrate including a through-hole and a display portion provided on the substrate, surrounding the through-hole, and displaying an image; and a watch needle unit including a rotation shaft inserted in the through-hole and rotating, and watch needles extended to an upper portion of the display portion from the rotation shaft.

The watch needle unit can further include: a main body where the display device is provided in an upper portion thereof; and a driver protruding from the main body corresponding to the through-hole and including the rotation shaft.

The watch needles can float above the surface of the display unit.

The display device can have a ring shape, and the watch needle unit can have a circular shape.

The through-hole can be provided in a plurality, and each of the plurality of through-holes is separated from one another and surrounded by the display portion, and the rotation shaft can be provided in a plurality, the watch needle is provided in a plurality, and the plurality of rotation shafts can be separated from each other and inserted into the respective through-holes.

Another aspect is a display device, comprising: a substrate having a through-hole; and a display unit formed on the substrate and surrounding the through-hole, wherein the display unit is configured to display an image.

In the above display device, the substrate comprises: a display area surrounding the through-hole; and a non-display area neighboring the display area.

In the above display device, the non-display area surrounds the display area.

In the above display device, the non-display area comprises: a first non-display area surrounding an outer edge of the display area; and a second non-display area surrounding the through-hole and interposed between the through-hole and the display area.

In the above display device, the display unit comprises: a plurality of wires including a selected wire neighboring the through-hole; and a plurality of pixels electrically connected to the wires, wherein the selected wire is curved and extends along the edge of the through-hole.

In the above display device, the wires comprise: a first line extending in a first direction; and a second line extending in a second direction crossing the first direction, wherein the second line crosses the first line, wherein at least one of the first and second lines neighbors the through-hole, and wherein the at least one line is curved and extends along the edge of the through-hole.

In the above display device, the pixel comprises an organic light-emitting diode (OLED).

The above display device further comprises a first driving circuit formed in the non-display area and electrically connected to the wires.

The above display device further comprises a second driving circuit formed in the display area and electrically connected to the wires.

In the above display device, at least one of the substrate and the display area has a ring shape.

In the above display device, the through-hole includes a plurality of through-holes, wherein the through-holes are separated from one another and surrounded by the display area.

Another aspect is an electronic watch, comprising: a display device including a substrate having a through-hole and a display portion formed on the substrate, wherein the display portion surrounds the through-hole and is configured to display an image; and a watch needle unit including i) a rotation shaft inserted in the through-hole and configured to rotate and ii) at least one watch needle extending from the rotation shaft to an upper portion of the display portion.

In the above watch, the watch needle unit further comprises: a main body in which the display device is provided in an upper portion thereof; and a shaft driver protruding from the through-hole and including the rotation shaft.

In the above watch, the watch needle and a top surface of the display unit have space therebetween.

In the above watch, the display device has a ring shape, and wherein the watch needle unit has a substantially circular shape.

In the above watch, the through-hole includes a plurality of through-holes, wherein the through-holes are separated from one another and surrounded by the display portion, wherein the rotation shaft includes a plurality of rotation shafts, wherein the watch needle includes a plurality of watch needles, and wherein the rotation shafts are separated from one another and inserted into the respective through-holes.

Another aspect is an electronic watch including a display device, the watch comprising: a watch needle unit including i) a shaft driver, ii) a rotation shaft formed on the shaft driver, and iii) at least one watch needle extending from the rotation shaft, wherein the display device includes a substrate having at least one through-hole and a display unit formed on the substrate, wherein the display unit surrounds the through-hole and is configured to display an image, wherein the shaft driver is inserted into the through-hole.

The above watch further comprises an encapsulation portion stacked on the display device and a portion of the substrate, wherein the height of the shaft driver is substantially the same as the combined height of the stacked encapsulation portion, display device and substrate, and wherein the heights are defined in the depth dimension of the display device.

In the above watch, the rotation shaft extends in a lateral direction of the display device, and wherein an outer edge of the display device is further from the rotation shaft than an outer edge of the watch needle.

The above watch further comprises a main body, wherein the shaft driver and the substrate are placed on the main body, and wherein the height of the shaft driver is greater than the height of the main body.

According to at least one of the disclosed embodiments, a display device combined with mechanical watch needles, and a watch including the same can be provided.

DETAILED DESCRIPTION OF CERTAIN INVENTIVE EMBODIMENTS

Figure 1:
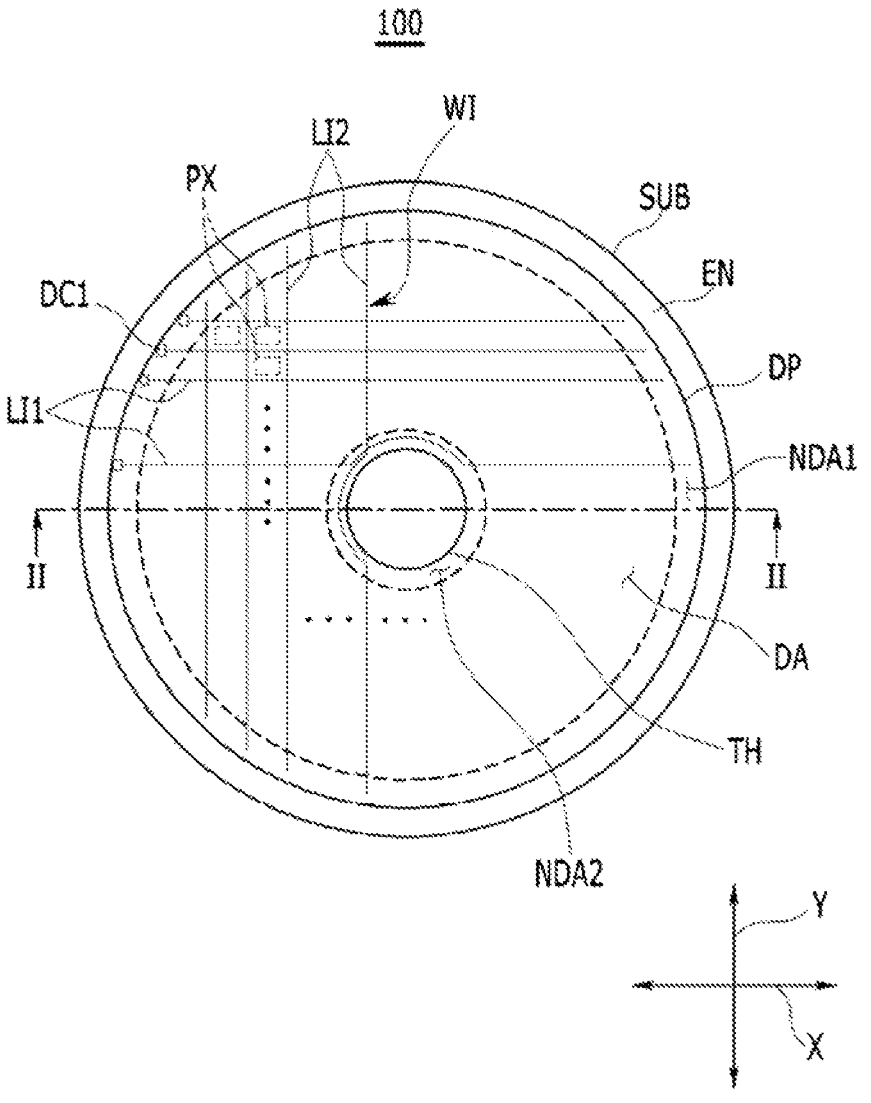
FIG. 1 is a top plan view of a display device according to an exemplary embodiment.

The described technology will be described more fully hereinafter with reference to the accompanying drawings, in which exemplary embodiments of the described technology are shown. As those skilled in the art would realize, the described embodiments can be modified in various different ways, all without departing from the spirit or scope of the described technology.

Accordingly, the drawings and description are to be regarded as illustrative in nature and not restrictive. Like reference numerals designate like elements throughout the specification.

Further, in exemplary embodiments, since like reference numerals designate like elements having the same configuration, a first exemplary embodiment is representatively described, and in other exemplary embodiments, only configurations that differ from the first exemplary embodiment will be described.

In addition, the size and thickness of each configuration shown in the drawings are arbitrarily shown for better understanding and ease of description, but the described technology is not limited thereto.

In the drawings, the thickness of layers, films, panels, regions, etc., are exaggerated for clarity. In the drawings, for understanding and ease of description, the thickness of some layers and areas is exaggerated. It will be understood that when an element such as a layer, film, region, or substrate is referred to as being "on" another element, it can be directly on the other element or intervening elements can also be present.

In addition, unless explicitly described to the contrary, the word "comprise" and variations such as "comprises" or "comprising", will be understood to imply the inclusion of stated elements but not the exclusion of any other elements. Further, throughout the specification, the word "on" means positioning on or below the object portion, but does not essentially mean positioning on the upper side of the object portion based on a gravitational direction. In this disclosure, the term "substantially" includes the meanings of completely, almost completely or to any significant degree under some applications and in accordance with those skilled in the art. The term "connected" can include an electrical connection.

Hereinafter, a display device according to an exemplary embodiment will be described with reference to FIG. 1 to FIG. 3.

FIG. 1 is a top plan view of a display device 100 according to an exemplary embodiment. FIG. 2 is a cross-sectional view of FIG. 1, taken along the line II-II.

Figure 2:
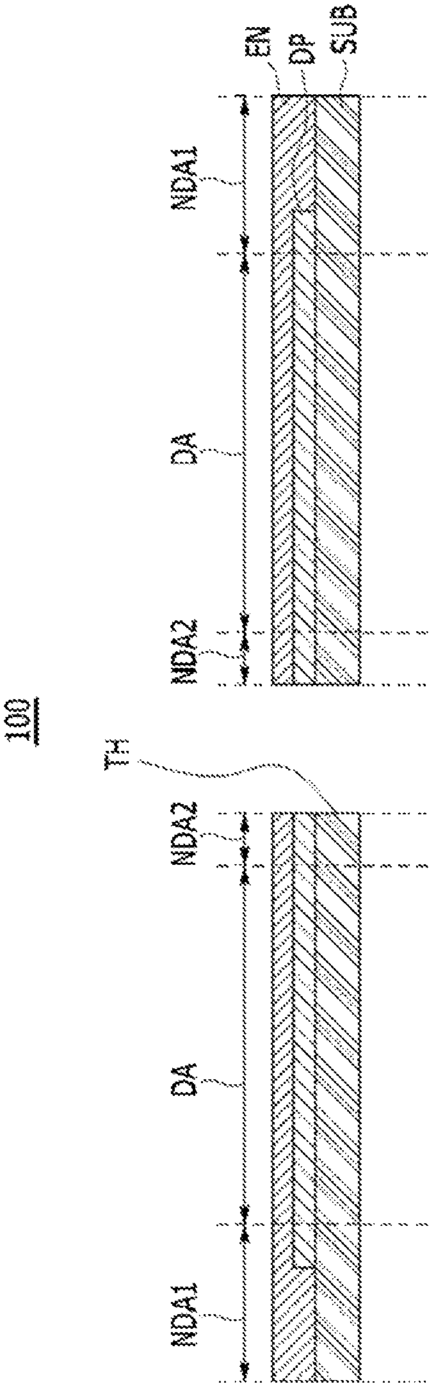
FIG. 2 is a cross-sectional view of FIG. 1, taken along the line II-II.

As shown in FIG. 1 and FIG. 2, the display device 100 displays an image, and includes a substrate SUB, a display portion DP, and an encapsulation portion EN.

The substrate SUB can be formed of glass, quartz, ceramic, sapphire, plastic, metal, and the like, and can be flexible, stretchable, rollable, or foldable. Since the substrate SUB is flexible, stretchable, rollable, or foldable, the overall OLED display can be flexible, stretchable, rollable, or foldable.

The substrate SUB includes a through-hole TH, a display area DA, and non-display areas NDA1 and NDA2.

The through-hole TH is formed in the shape of a hole penetrating the substrate SUB, and is provided in a center area of the substrate SUB. In another exemplary embodiment, the through-hole TH is provided in a predetermined area of the entire area of the substrate SUB. The through-hole TH has a substantially circular shape in a plane view, but can have various polygonal shapes, such as a triangle, a quadrangle, a pentagon, a hexagon, a heptagon, and the like, or a closed loop shape, or an oval shape.

The display area DA is formed neighboring the through-hole TH, and can be an area where the display portion DP displays an image.

The non-display areas NDA1 and NDA2 neighbor the display area DA, and can be areas where the display portion DP does not display an image. The non-display areas NDA1 and NDA2 surround the display area DA, and include a first sub non-display area NDA1 and a second sub non-display area NDA2.

The first sub non-display area NDA1 surrounds an outer edge of the display area DA, and the second sub non-display area NDA2 surrounds an outer edge of the through-hole TH between the through-hole TH and the display area DA. The second sub non-display area NDA2 neighbors each of the through-hole TH and the display area DA between the through-hole TH and the display area DA.

Where a through-hole is formed, the substrate SUB has a ring shape in a plane view, but can have various polygonal shapes, such as a triangle, a quadrangle, a pentagon, a hexagon, a heptagon, and the like, or have a closed loop shape, or an oval shape.

The display portion DP is formed on the substrate SUB. The display portion DP displays an image, and at least part of the display portion DP can be formed in the display area DA. For example, part of the display portion DP is formed on the display area DA, whereas other parts are formed in the non-display areas NDA1 and NDA2. The display portion DP surrounds the through-hole TH of the substrate SUB, and therefore the display portion DP does not overlap the through-hole TH. Since the display portion DP does not overlap the through-hole TH, the through-hole TH is exposed to the outside.

The display portion DP does not overlap the through-hole TH, and thus it has a shape of a ring in a plane view, but this is not restrictive. Where a through-hole is formed, the display portion DP can have polygonal shapes, such as a triangle, a quadrangle, a pentagon, a hexagon, a heptagon, and the like, or have a closed loop shape, or an oval shape.

The display portion DP includes a plurality of wires WI, a first driving circuit DC1 connected to the wires WI, and a plurality of pixels PX connected to the wires WI. Here, a pixel PX can imply the minimum unit for displaying an image, but this is not restrictive.

Figure 3:
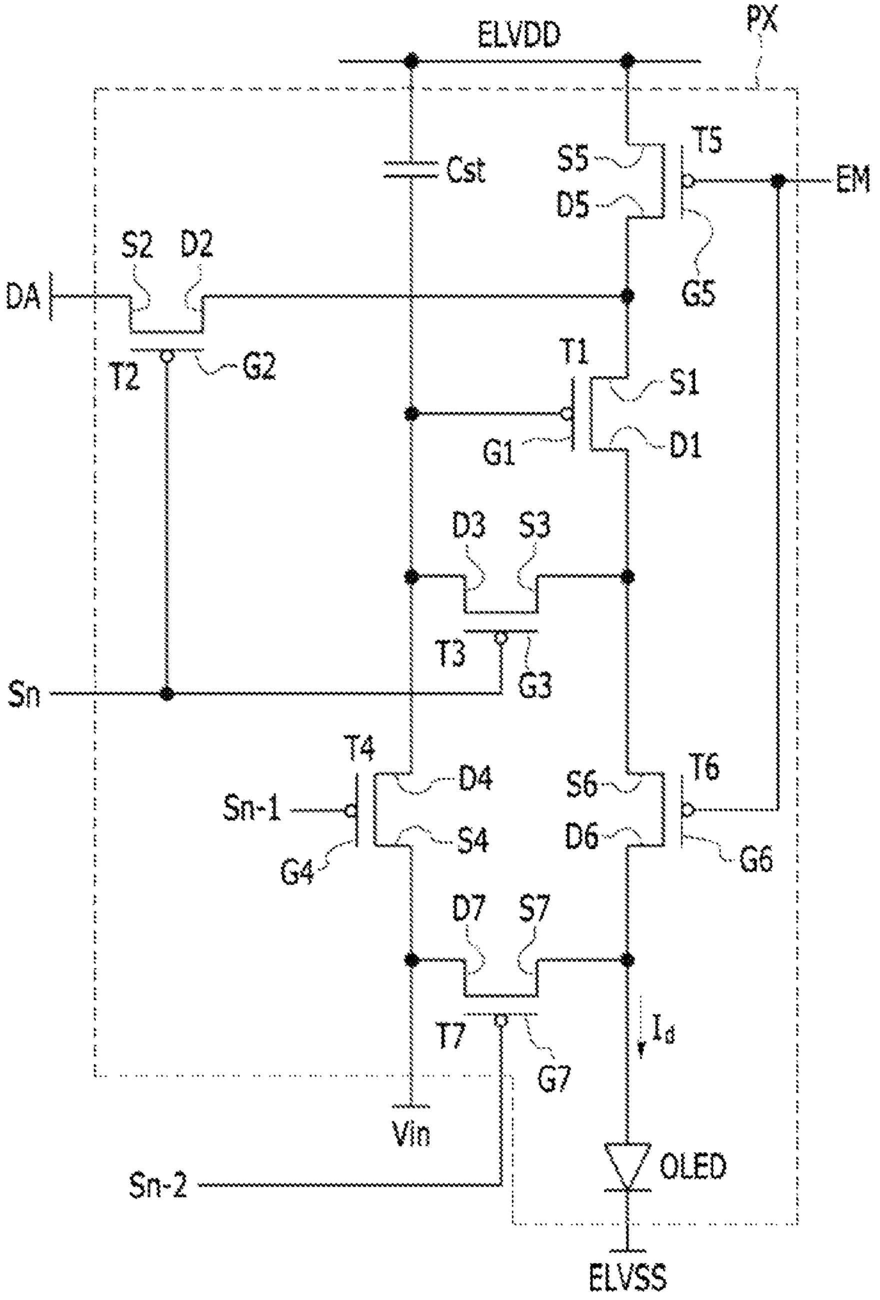
FIG. 3 is a circuit diagram of a pixel in the display device of FIG. 1.

FIG. 3 is a circuit diagram of the pixel shown in FIG. 1.

As shown in FIG. 3, at least one of the pixels PX includes a plurality of thin film transistors T1, T2, T3, T4, T5, T6, and T7, a plurality of wires Sn, Sn−1, Sn−2, EM, Vin, DA, and ELVDD selectively connected to the thin film transistors T1, T2, T3, T4, T5, T6, and T7, a capacitor Cst, and an OLED. Here, the wires Sn, Sn−1, Sn−2, EM, Vin, DA, and ELVDD can be wires included in the wires WI that have been described above with reference to FIG. 1.

The thin film transistors T1, T2, T3, T4, T5, T6, and T7 include a first thin film transistor T1, a second thin film transistor T2, a third thin film transistor T3, a fourth thin film transistor T4, a fifth thin film transistor T5, a sixth thin film transistor T6, and a seventh thin film transistor T7.

A first gate electrode G1 of the first thin film transistor T1 is connected to a third drain electrode D3 of the third thin film transistor T3 and a fourth drain electrode D4 of the fourth thin film transistor T4, a first source electrode S1 of the first thin film transistor T1 is connected to a second drain electrode of the second thin film transistor T2 and a fifth drain electrode D5 of the fifth thin film transistor T5, and a first drain electrode D1 of the first thin film transistor T1 is connected to a third source electrode S3 of the third thin film transistor T3 and a sixth source electrode S6 of the sixth thin film transistor T6.

A second gate electrode G2 of the second thin film transistor T2 is connected to a first scan line Sn, a second source electrode S2 is connected to a data line DA, and the second drain electrode D2 is connected to a first source electrode S1 of the first thin film transistor T1.

A third gate electrode G3 of the third thin film transistor T3 is connected to the first scan line Sn, the third source electrode S3 is connected to the first drain electrode D1 of the first thin film transistor T1, and the third drain electrode D3 is connected to the first gate electrode G1 of the first thin film transistor T1.

A fourth gate electrode G4 of the fourth thin film transistor T4 is connected to a second scan line Sn−1, a fourth source electrode S4 is connected to an initialization power line Vin, and the fourth drain electrode D4 is connected to the first gate electrode G1 of the first thin film transistor T1.

A fifth gate electrode G5 of the fifth thin film transistor T5 is connected to an emission control line EM, a fifth source electrode S5 is connected to a driving power line ELVDD, and the fifth drain electrode D5 is connected to the first source electrode S1 of the first thin film transistor T1.

A sixth gate electrode G6 of the sixth thin film transistor T6 is connected to the emission control line EM, and a sixth source electrode S6 is connected to the first drain electrode D1 of the first thin film transistor T1.

A seventh gate electrode G7 of the seventh thin film transistor T7 is connected to a third scan line Sn−2, a seventh source electrode S7 is connected to the OLED, and the seventh drain electrode D7 is connected to the fourth source electrode S4 of the fourth thin film transistor T4.

The wires include the first scan line Sn transmitting a first scan signal to the second gate electrode G2 of the second thin film transistor T2 and the third gate electrode G3 of the third thin film transistor T3, the second scan line Sn−1 transmitting a second scan signal to the fourth gate electrode G4 of the fourth thin film transistor T4, the third scan line Sn−2 transmitting a third scan signal to the seventh gate electrode G7 of the seventh thin film transistor T7, the emission control line EM transmitting an emission control signal to the fifth gate electrode G5 and the sixth gate electrode G6, a data line DA transmitting a data signal to the second source electrode S2 of the second thin film transistor T2, the driving power line ELVDD supplying a driving signal to a first electrode of the capacitor Cst and the fifth source electrode S5 of the fifth thin film transistor T5, and the initialization power line Vin supplying an initialization signal to the fourth source electrode S4 of the fourth thin film transistor T4.

The capacitor Cst includes the first electrode connected to the driving power line ELVDD and a second electrode connected to the first gate electrode G1 and the third drain electrode D3 of the third thin film transistor T3.

The OLED includes a first electrode, a second electrode provided on the first electrode, and an organic emission layer provided between the first electrode and the second electrode. The first electrode of the OLED is connected to the seventh source electrode S7 of the seventh thin film transistor T7 and the sixth drain electrode D6 of the sixth thin film transistor T6, and the second electrode is connected to a common power ELVSS to which a common signal is transmitted.

As an example of the driving of the pixel, first, when the third scan signal is transferred to the third scan line Sn−2 to turn on the seventh thin film transistor T7, remaining current flowing in the anode of the OLED is discharged to the fourth thin film transistor T4 through the seventh thin film transistor T7, thereby suppressing undesired light emission of the OLED due to the remaining current flowing in the anode of the OLED.

Next, when the second scan signal is transferred to the second scan line Sn−1 and an initialization signal is transferred to the initialization power line Vin, the fourth thin film transistor T4 is turned on, an initialization voltage due to the initialization signal is supplied to the first gate electrode G1 of the first thin film transistor T1 and the other electrode of the capacitor Cst through the fourth thin film transistor T4, and as a result, the first gate electrode G1 and the capacitor Cst are initialized. In this case, while the first gate electrode G1 is initialized, the first thin film transistor T1 is turned on.

Next, when the first scan signal is transferred to the first scan line Sn and the data signal is transferred to the data line DA, the second thin film transistor T2 and the third thin film transistor T3 are turned on, and a data voltage Vd due to the data signal is supplied to the first gate electrode G1 through the second thin film transistor T2, the first thin film transistor T1, and the third thin film transistor T3. In this case, the voltage supplied to the first gate electrode G1 is supplied as a compensation voltage Vd+Vth (Vth is a negative (−) value) which is reduced by a threshold voltage Vth of the first thin film transistor T1 from the data voltage Vd supplied from the initial data line DA. The compensation voltage Vd+Vth supplied to the first gate electrode G1 is even supplied to the second electrode of the capacitor Cst connected to the first gate electrode G1.

Next, a driving voltage Vel is supplied by the driving signal to the first electrode of the capacitor Cst from the driving power line ELVDD and the aforementioned compensation voltage Vd+Vth is supplied to the second electrode, and as a result, a charge corresponding to a difference between voltages applied to both electrodes is stored in the capacitor Cst and the first thin film transistor T1 is turned on for a predetermined time.

Next, when the light emission control signal is applied to the light emission control line EM, both the fifth thin film transistor T5 and the sixth thin film transistor T6 are turned on and then the driving voltage Vel is supplied by the driving signal to the first thin film transistor T1 through the fifth thin film transistor T5 from the driving power line ELVDD.

Then, while the driving voltage Vel passes through the first thin film transistor T1, which is turned on by the capacitor Cst, a driving current Id corresponding to a voltage difference between the voltage supplied to the first gate electrode G1 by the capacitor Cst and the driving voltage Vel flows in the first drain electrode D1 of the first thin film transistor T1, and the driving current Id is supplied to the OLED through the sixth thin film transistor T6 and the OLED emits light for a predetermined time.

Meanwhile, one pixel PX of the display device according to the exemplary embodiment is configured by the first thin film transistor T1 to the seventh thin film transistor T7, the capacitor Cst, the first to third scan lines Sn to Sn−2, the data line DA, the driving power line ELVDD, and the initialization power line Vin, but is not limited thereto. One pixel of a display device according to another exemplary embodiment can be configured by wires including two or more thin film transistors, one or more capacitors, one or more scan lines, one or more scan lines, and one or more driving power lines.

Referring back to FIG. 1 and FIG. 2, the wires WI connected to the pixels PX include a plurality of first lines LI1 and a plurality of second lines LI2. Each of the first lines LI1 extend in a first direction X on the substrate SUB, and the respective first lines LI1 are arranged at a distance from each other along a second direction Y that crosses the first direction X. Each of the plurality of first lines LI1 can include one or more of the first scan line Sn, the second scan line Sn−1, the third scan line Sn−2, the emission control line EM, the data line DA, the driving power line ELVDD, and the initialization power line Vin, which have been described above with reference to FIG. 3, and each of the plurality of first lines LI1 can, for example, include one or more of the first scan line Sn, the second scan line Sn−2, the third scan line Sn−2, and the emission control line EM.

Among the first lines LI1, one or more first lines LI1 neighboring the through-hole TH is curved and extends along the edge of the through-hole TH. Meanwhile, in the exemplary embodiment, the first line LI1 neighboring the through-hole TH is curved and extends along the edge of the through-hole TH, but the first line LI1 can be divided by the through-hole TH according to another exemplary embodiment.

Each of the first lines LI1 is connected to a first driving circuit CD1 provided in a first sub non-display area NDA1 among the non-display areas NDA1 and NDA2 of the substrate SUB.

The first driving circuit DC1 is provided corresponding to the non-display areas NDA1 and NDA2 of the substrate SUB, and is connected to the first line LI1 among the wires WI. The first driving circuit DC1 can be mounted to the substrate SUB as a chip, or can be directly formed in the substrate SUB as a circuit.

In the exemplary embodiment, the first driving circuit DC1 is connected to the first line LI1, but this is not restrictive. The first driving circuit DC1 can be connected to a driving circuit connected to the second line LI1 or can be connected to the second line LI2.

The second lines LI2 extend in a second direction Y that crosses the first direction X, and thus cross the first lines LI1 on the substrate SUB. The second lines LI2 are respectively distanced from each other along the first direction X. The second lines LI2 can respectively include one or more of the first scan line Sn, the second scan line Sn−1, the third scan line Sn−2, the emission control line EM, the data line DA, the driving power line ELVDD, the initialization power line Vin that have been described above with reference to FIG. 3, and the second lines LI2 can, for example, respectively include one or more of the data line DA, the driving power line LEVDD, and the initialization power line Vin.

Among the second lines LI2, one or more second lines LI2 neighboring the through-hole TH is curved and extends along the edge of the through-hole TH. Meanwhile, in the exemplary embodiment, the second line LI2 neighboring the through-hole TH is curved and extends along the edge of the through-hole TH, but the second line LI2 is divided by the through-hole TH according to another exemplary embodiment.

An encapsulation portion EN covers the display portion DP, and encapsulates the display portion DP together with the substrate SUB. The encapsulation portion EN can be formed of a single layer or multiple layers including one or more of an organic material, an inorganic material, and a metal material.

As described above, the display portion DP includes an organic light emitting diode, and thus the display device 100 is an organic light emitting display device, but this is not restrictive. According to another exemplary embodiment, a display device includes a display portion displaying an image, and in this case, the display device is one of a variety of display devices, such as a liquid crystal display (LCD), a plasma display (PD), a field emission display (FED), an electrophoretic display (EPD), an electrowetting display (EWD), and the like.

As described, the display device 100 including the ring-shaped substrate SUB and the ring-shaped display portion DP is provided.

Hereinafter, referring to FIG. 4, a display device according to another exemplary embodiment will be described. Hereinafter, different parts from the display device according to the exemplary embodiment described above will be described.

Figure 4:
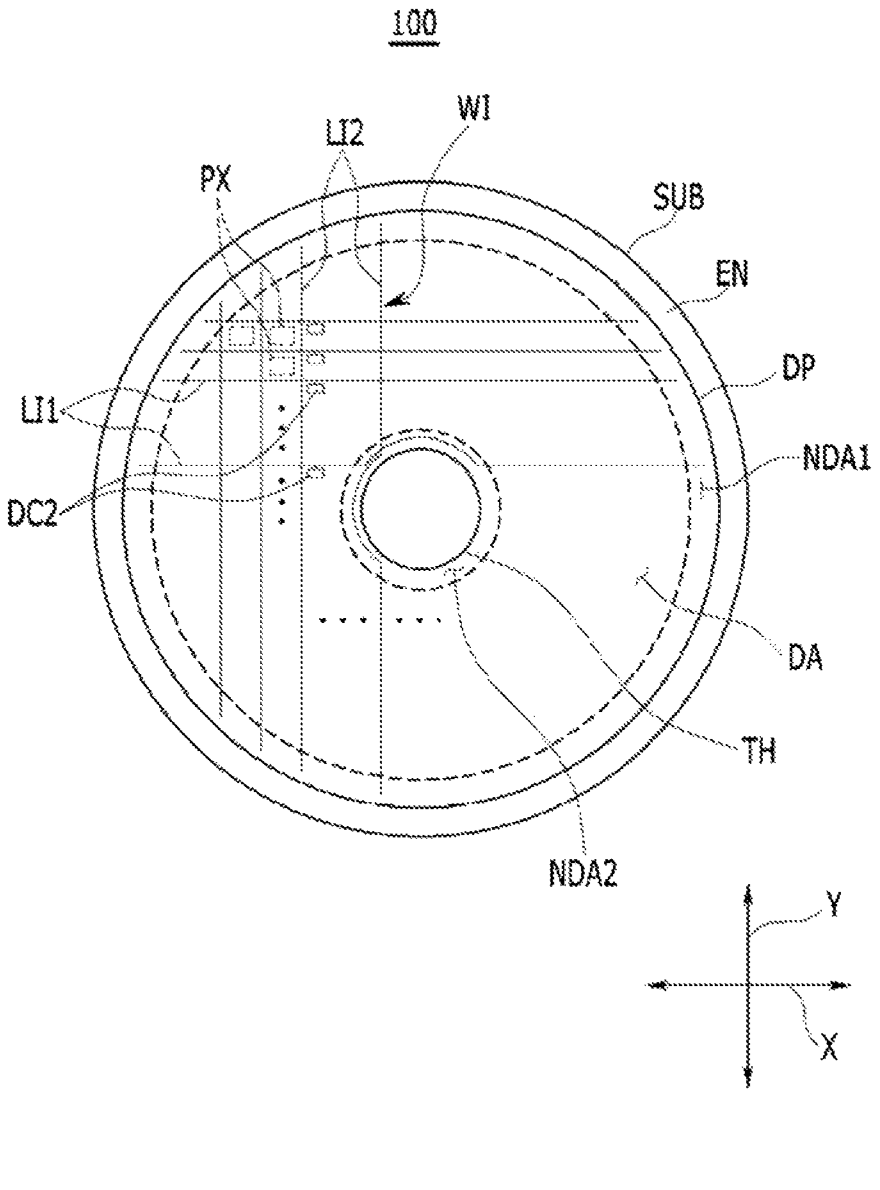
FIG. 4 is a top plan view of a display device according to another exemplary embodiment.

FIG. 4 is a top plan view of a display device 100 according to another exemplary embodiment.

As shown in FIG. 4, a display portion DP of the display device 100 includes a plurality of wires WI, second driving circuits DC2 connected to the wires WI, and a plurality of pixels PX connected to the wires WI.

The second driving circuits DC2 are provided corresponding to a display area DA of a substrate SUB, and are connected to first lines LI1 among the wires WI. The second driving circuit DC2 can be directly formed in the substrate SUB as a chip, and a detailed shape of the second driving circuit DC2 can have various known shapes.

As described, in the display device 100 according to the present exemplary embodiment, the second driving circuits DC2 connected to the wires WI are provided in the display area DA and thus the area of non-display areas NDA1 and NDA2 can be minimized, thereby maximizing the area of the display area DA. That is, the ring-shaped display device 100 in which the area of the display area DA displaying an image is maximized.

Hereinafter, a display device according to another exemplary embodiment will be described with reference to FIG. 5. Hereinafter, different parts from the display device according to the exemplary embodiment described above will be described.

Figure 5:
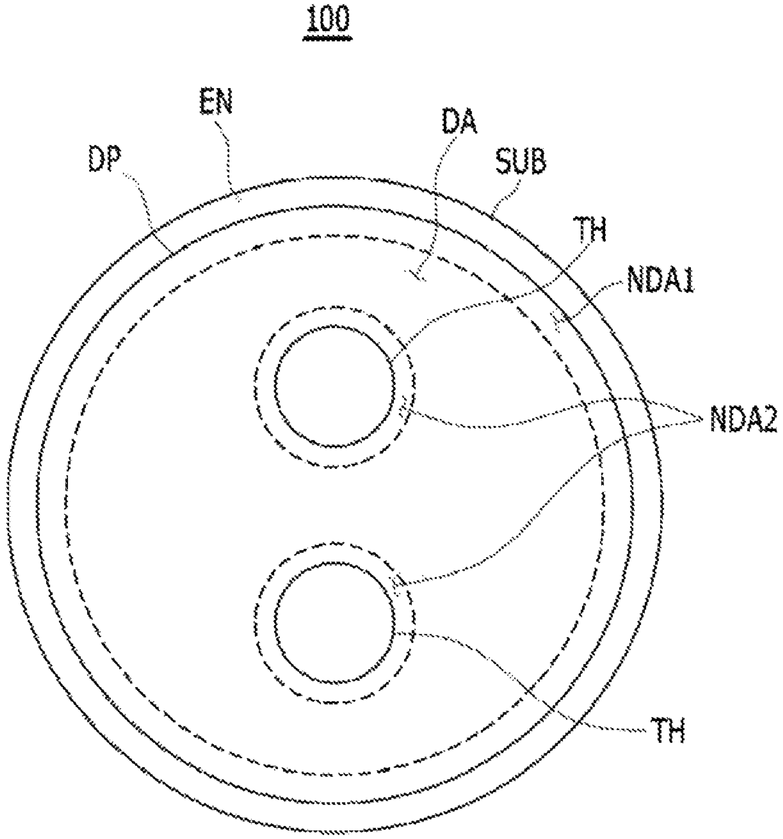
FIG. 5 is a top plan view of a display device according to another exemplary embodiment.

FIG. 5 is a top plan view of a display device according to another exemplary embodiment.

As shown in FIG. 5, a substrate SUB includes a plurality of through-holes TH, a display area DA, and non-display areas NDA1 and NDA2.

The through-holes TH are respectively separated from each other, and each of the holes TH is surround by a display portion.

The display area DA neighbors the through-holes TH, and can be an area where an image displayed by the display portion DP is displayed.

The non-display areas NDA1 and NDA2 neighbor the display area DA, and can be areas where an image displayed by the display portion DP is displayed. The non-display areas NDA1 and NDA2 surround the display area DA and include a first sub non-display area NDA1 and a second sub non-display area NDA2.

The first sub non-display area NDA1 surrounds an outer edge of the display area DA, and the second sub non-display areas NDA2 surround outer edges of the through-holes TH between the respective through-holes TH and the display area DA. The second sub non-display areas NDA2 are provided between the respective through-holes TH and the display area DA.

The display portion DP surrounds the through-holes TH of the substrate SUB, and therefore the display portion DP does not overlap the respective through-holes TH. Since the display portion DP does not overlap any of the through-holes TH, the through-holes TH are respectively exposed to the outside.

Hereinafter, a watch according to another exemplary embodiment will be described with reference to FIG. 6 and FIG. 7. A display device to be described hereinafter can be the display device that has been described with reference to FIG. 1 to FIG. 3, or FIG. 4, but it is not restrictive.

Figure 6:
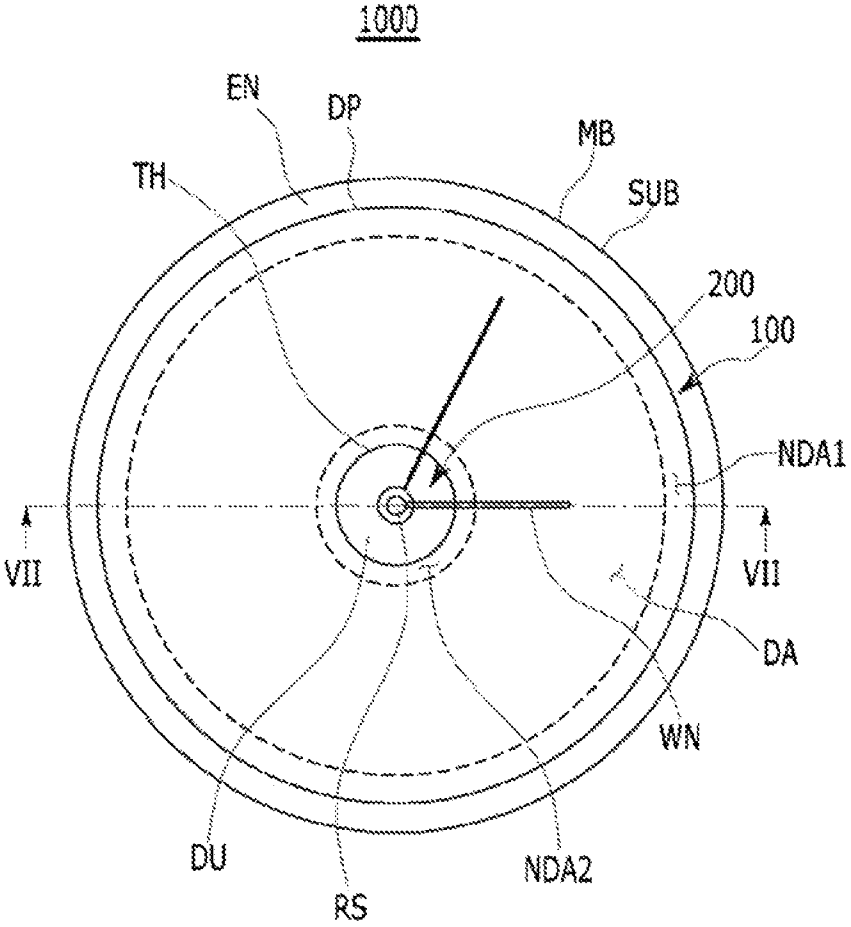
FIG. 6 is a top plan view of a watch according to another exemplary embodiment.

FIG. 6 is a top plan view of a watch 1000 according to another exemplary embodiment. FIG. 7 is a cross-sectional view of FIG. 6, taken along the line VII-VII.

Figure 7:
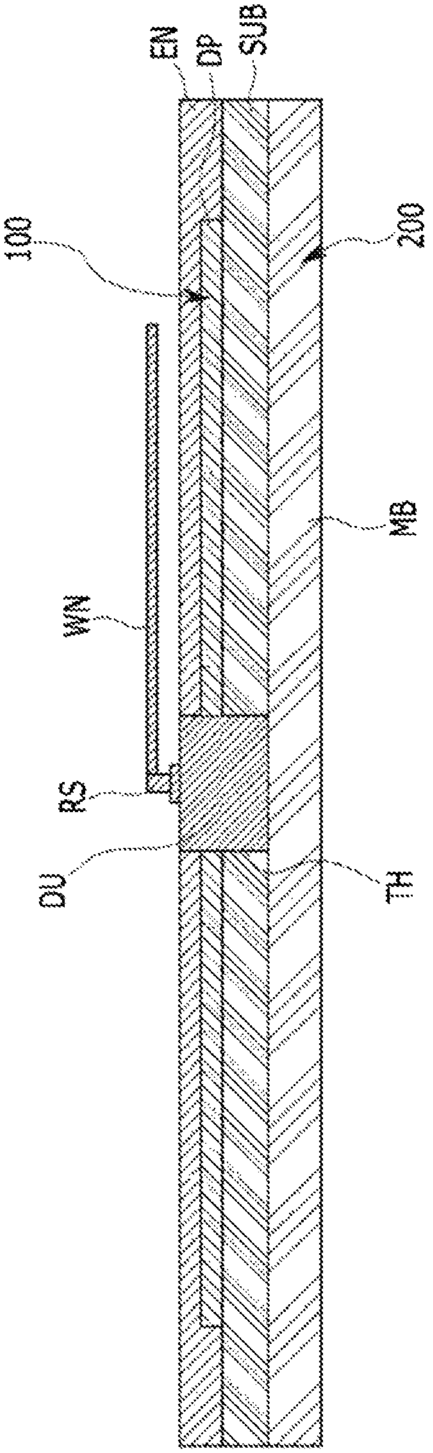
FIG. 7 is a cross-sectional view of FIG. 6, taken along the line VII-VII.

As shown in FIG. 6 and FIG. 7, the watch 1000 includes a display device 100 and a watch needle unit 200 combined with the display device 100.

The display device 100 includes a substrate SUB including a through-hole TH, a display portion DP surrounding the through-hole TH and displaying an image, and an encapsulation portion EN. The display device 100 can display an image of numbers or Roman numerals corresponding to a watch, and this is not restrictive. The display device 100 can display an image, such as various videos.

The watch needle unit 200 includes a main body MB, a driving unit (or shaft driver) DU including a rotation shaft RS, and watch needles WN.

The display device 100 is provided in an upper portion of the main body MB, and the main body MB supports the display device 100. The main body MB has a circular shape in a plane view, but this is not restrictive. The main body MB can have various polygonal shapes such as a triangle, a quadrangle, a pentagon, a hexagon, a heptagon, and the like where a through-hole is formed, a closed loop shape, or an oval shape. Since the main body MB has a circular shape, the watch needle unit 200 has a circular shape, but this is not restrictive. Where a through-hole is formed, the watch needle unit 200 can have various polygonal shapes, such as a triangle, a quadrangle, a pentagon, a hexagon, a heptagon, and the like, or have a closed loop shape, or an oval shape.

The driving unit DU protrudes from the main body MB corresponding to the through-hole TH of the substrate SUB, and includes the rotation shaft RS being inserted into the through-hole TH, and thus rotating while protruding upward through the through-hole TH. The driving unit DU can include a plurality of gears that make the rotating shaft RS rotate, and the gears can have any known shape as long as the rotation shaft RS can rotate with predetermined timing. The driving unit DU makes the rotation shaft RS rotate, and as the rotation shaft RS rotates, the watch needles WN connected to the rotation shaft RS rotate with respect to the rotation shaft RS. The rotation shaft RS is provided in a plurality, and each of the rotation shafts RS can rotate with timing corresponding to an hour, minute, or second.

The watch needles WN are connected to the rotation shaft RS and extend to the upper portion of the display portion DP from the rotation shaft RS, and float above the surface of the display portion DP. The watch needles WN are provided in a plurality, and each of the plurality of watch needles WN is connected to each of the rotation shafts RS. Each of the plurality of watch needles WN can rotate with timing that corresponds to an hour, minute, or second, which corresponds to the rotation of each rotation shaft RS.

As described, the watch 1000 according to the present exemplary embodiment includes the watch needle unit 200 including the watch needles WN and the display device 100 combined with the watch needle unit 200 through the through-hole TH, and thus includes the display device 100 combined with mechanical watch needles WN.

That is, the watch 1000 including the display device 100 that can display temporally mechanical watch needles WN and various images can be provided.

Hereinafter, a watch according to another exemplary embodiment will be described with reference to FIG. 8. A display device to be described hereinafter can be the display device that has been described with reference to FIG. 5, but this is not restrictive.

Figure 8:
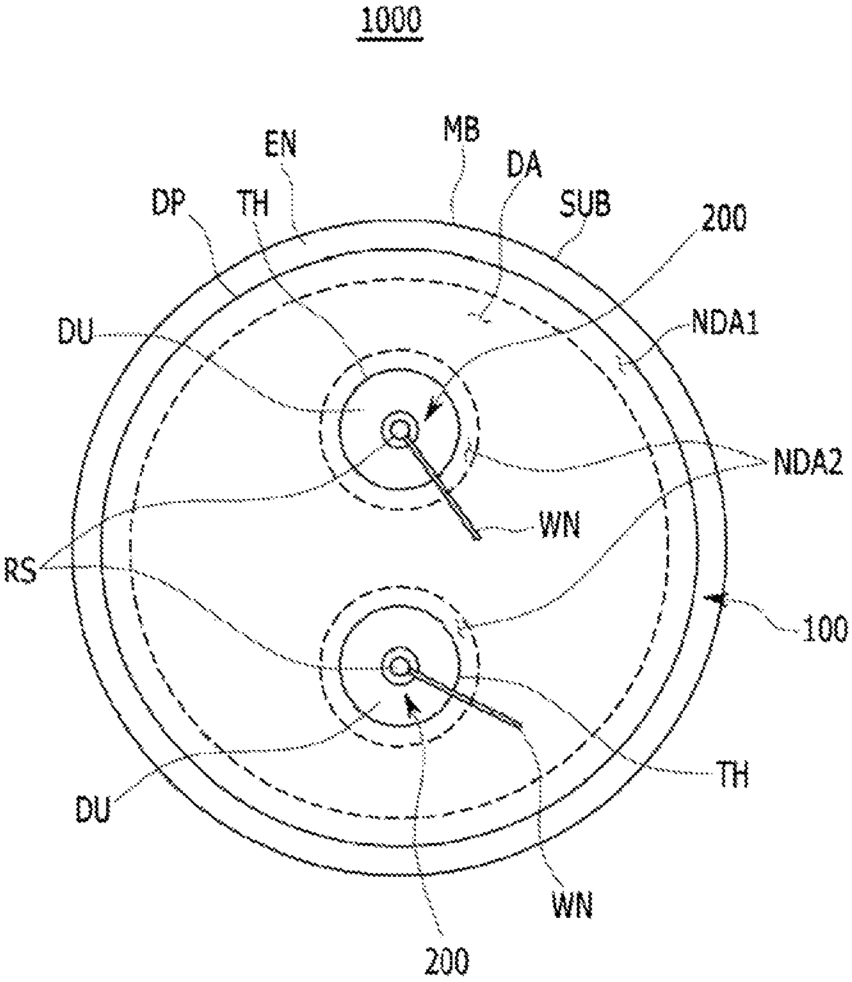
FIG. 8 is a top plan view of a watch according to another exemplary embodiment.

FIG. 8 is a top plan view of a watch 1000 according to another exemplary embodiment.

The watch 1000 incudes a display device 100 and a watch needle unit 200 combined with the display device 100.

The display device 100 includes a substrate SUB including a plurality of through-holes TH, a display portion DP surrounding the respective through-holes TH on the substrate SUB and displaying an image, and an encapsulation portion EN. The display device 100 can display an image of numbers or Roman numerals corresponding to a watch, and this is not restrictive. The display device 100 can display an image, such as various videos.

The watch needle unit 200 includes a main body MB, a plurality of driving units DU, each including a rotation shaft RS, and a plurality of watch needles WN.

The display device 100 is provided in an upper portion of the main body MB, and the main body MB supports the display device 100. The main body MB has a circular shape in a plane view, but this is not restrictive. Where a through-hole is formed, the main body MB can have various polygonal shapes, such as a triangle, a quadrangle, a pentagon, a hexagon, a heptagon, and the like, or have a closed loop shape, or an oval shape. Since the main body MB has a circular shape, the watch needle unit 200 has a circular shape, but this is not restrictive. Where a through-hole is formed, the watch needle unit 200 can have various polygonal shapes, such as a triangle, a quadrangle, a pentagon, a hexagon, a heptagon, and the like, or have a closed loop shape, or an oval shape.

Each of the driving units DU protrudes from the main body M corresponding to each of the plurality of through-holes TH of the substrate SUB, and includes one or more rotation shafts RS inserted into each through-hole TH and rotating while protruding upward through each through-hole TH. Each driving unit DU can include a plurality of gears that make the rotation shaft RS rotate, and the gear can have various known shapes as long as the rotation shaft RS can rotate with predetermined timing. Each driving unit DU makes the rotation shaft RS rotate, and as the rotation shaft RS rotates, the watch needles WN connected to the rotation shaft RS rotate with respect to the rotation shaft RS. The rotation shaft RS is provided in a plurality, and each of the plurality of rotation shafts RS can rotate with timing corresponding to an hour, minute, or second.

Each of the watch needles WN is connected to each of the rotation shafts RS and then extends to an upper portion of the display portion DP from each of the rotation shafts RS, and floats above the surface of the display portion DP. Each of the watch needles WN can rotate with timing that corresponds to an hour, minute, or second, which corresponds to the rotation of each rotation shaft RS.

As described, the watch 1000 according to the present exemplary embodiment includes the watch needle unit 200 including the watch needles WN and the display device 100 combined with the watch needle unit 200 through the through-hole TH, and thus includes the display device 100 combined with mechanical watch needles WN.

That is, the watch 1000 including the display device 100 that can display temporally mechanical watch needles WN and various images can be provided.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
- a substrate having a through-hole;
- a display area surrounding the through-hole and including pixels;
- a first non-display area disposed between the display area and the through-hole;
- a needle disposed on the substrate; and
- a first signal line disposed on the substrate, electrically connected to at least one of the pixels, and including a curved portion in the first non-display area.

2. The display device of claim 1, further comprising:
- a second signal line disposed on the substrate, electrically connected to at least one of the pixels, and including a curved portion in the first non-display area.

3. The display device of claim 2, wherein the second signal line crosses the first signal line in the first non-display area.

4. The display device of claim 2, wherein each of the first signal line and the second signal line extends across the display area and the first non-display area.

5. The display device of claim 2, wherein the first signal line is a scan line transmitting a scan signal or an emission control line transmitting an emission control signal, and
- wherein the second signal line is a data line transmitting a data signal.

6. The display device of claim 2, wherein each of the first signal line and the second signal line is substantially straight in the display area.

7. The display device of claim 1, wherein the needle includes a portion overlapping the through-hole.

8. The display device of claim 1, wherein the needle extends across the display area and the first non-display area.

9. The display device of claim 1, further comprising:
- a display portion disposed on the substrate and displaying images; and
- an encapsulation portion disposed between the display portion and the needle and covering the display portion.

10. The display device of claim 9, wherein the encapsulation portion includes multiple layers each including an organic material or an inorganic material.

11. The display device of claim 1, further comprising:
a second non-display area surrounding the display area.

12. The display device of claim 11, further comprising:
a driving circuit disposed in the second non-display area and electrically connected to the first signal line.

13. The display device of claim 11, wherein at least one of the display area, the first non-display area, and the second non-display area has a ring shape.

14. The display device of claim 1, wherein the substrate has an additional through-hole separated from the through-hole and surrounded by the display area.

15. The display device of claim 14, further comprising:
an additional needle disposed on the substrate and including a portion overlapping the additional through-hole.

16. The display device of claim 1, wherein the first signal line further includes:
a first straight portion extending in a first direction in the display area; and
a second straight portion extending in the first direction in the display area,
wherein the curved portion is disposed between the first straight portion and the second straight portion and connected to the first straight portion and the second straight portion.

17. The display device of claim 1, wherein the first signal line further includes:
a first straight portion extending in a first direction in the display area; and
a second straight portion extending in a second direction crossing the first direction in the display area, and
wherein the curved portion is disposed between the first straight portion and the second straight portion and connected to the first straight portion and the second straight portion.

18. The display device of claim 1, wherein the display device is capable of displaying images corresponding to numbers or Roman numerals.

19. The display device of claim 1, further comprising:
a driving unit overlapping the through-hole.

20. The display device of claim 19, wherein the driving unit includes a rotation shaft and gears that rotate the rotation shaft, and wherein the needle is connected to the rotation shaft.

21. The display device of claim 20, wherein the driving unit is configured to rotate the rotation shaft, and the needle rotates with respect to the rotation shaft.

22. The display device of claim 1, further comprising:
a display portion disposed on the substrate and including the pixels,
wherein the needle floats above a surface of the display portion.

23. An electronic device, comprising:
a display device including a substrate having a through-hole and a display portion disposed on the substrate, wherein the display portion surrounds the through-hole and displays an image; and
a needle unit including i) a rotation shaft inserted in the through-hole and rotating and ii) at least one needle extending from the rotation shaft to an upper portion of the display portion,
wherein the substrate comprises a display area and a non-display area between the display area and the through-hole,
wherein the display portion comprises a plurality of pixels and a plurality of wires electrically connected to the pixels, and
wherein at least two of the wires cross each other in the non-display area.

24. The electronic device of claim 23, wherein the needle unit further comprises:
a main body in which the display device is provided in an upper portion thereof; and
a shaft driver protruding from the through-hole and including the rotation shaft.

25. The electronic device of claim 23, wherein the needle and a top surface of the display portion have a space therebetween.

26. The electronic device of claim 23, wherein the display device has a ring shape, and wherein the needle unit has a substantially circular shape.

27. The electronic device of claim 23, wherein the through-hole includes a plurality of through-holes which are separated from one another and surrounded by the display portion, and
wherein the rotation shaft includes a plurality of rotation shafts, wherein the needle includes a plurality of needles, and wherein the rotation shafts are separated from one another and inserted into the respective through-holes.

28. An electronic device comprising:
a needle unit including i) a shaft driver, ii) a rotation shaft disposed on the shaft driver, and iii) at least one needle extending from the rotation shaft;
a display device; and
an encapsulation portion disposed on the display device,
wherein a height of the shaft driver is substantially identical to a combined height of the encapsulation portion and the display device, and wherein the heights are defined in the depth dimension of the display device,
wherein the display device includes a display portion and a substrate having at least one through-hole, wherein the display portion surrounds the through-hole and is disposed on the substrate and configured to display an image,
wherein the shaft driver is inserted into the through-hole, and
wherein the display portion comprises a plurality of pixels electrically connected to each other.

29. The electronic device of claim 28, wherein the rotation shaft extends in a lateral direction of the display device, and wherein an outer edge of the display device is farther from the rotation shaft than an outer edge of the needle.

30. The electronic device of claim 29, further comprising:
a main body, wherein the shaft driver and the substrate are disposed on the main body, and wherein a height of the shaft driver is greater than a height of the main body.

* * * * *